(12) United States Patent
Weckwerth et al.

(10) Patent No.: US 11,922,228 B2
(45) Date of Patent: Mar. 5, 2024

(54) HOST REQUEST PACING TO BALANCE RESOURCES AND THROUGHPUT

(71) Applicant: International Business Machines Corporation, Armonk, NY (US)

(72) Inventors: Rick A. Weckwerth, Oronoco, MN (US); Daniel Frank Moertl, Rochester, MN (US); Robert Edward Galbraith, Rochester, MN (US); Matthew Szekely, Austin, TX (US); Damir Anthony Jamsek, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 17/350,389

(22) Filed: Jun. 17, 2021

(65) Prior Publication Data
US 2022/0405150 A1   Dec. 22, 2022

(51) Int. Cl.
*G06F 9/46* (2006.01)
*G06F 1/10* (2006.01)
*G06F 9/48* (2006.01)
*G06F 9/50* (2006.01)
*G06F 9/52* (2006.01)

(52) U.S. Cl.
CPC .................. *G06F 9/52* (2013.01); *G06F 1/10* (2013.01); *G06F 9/4887* (2013.01); *G06F 9/5038* (2013.01)

(58) Field of Classification Search
CPC . G06F 9/52; G06F 1/10; G06F 9/4887; G06F 9/5038
See application file for complete search history.

(56) References Cited

U.S. PATENT DOCUMENTS

| | | | |
|---|---|---|---|
| 8,856,424 B2 | 10/2014 | Yoon | |
| 9,311,230 B2 | 4/2016 | Fitch | |
| 9,489,141 B2 | 11/2016 | Nanduri | |
| 9,658,782 B2 | 5/2017 | Romem | |
| 10,275,375 B2 | 4/2019 | Ayoub | |

OTHER PUBLICATIONS

Gibson, Garth, "Petascale Data Storage Institute", SciDAC PDSI Final Report, DOE Grant No. DEFC0206ER25767 (CMU), The Regents of the University of California, Santa Cruz, CA (United States), 2013, 82 pages, <https://doi.org/10.2172/1120946>.
Mitchell et al., "Overlapped Checkpointing with Hardware Assist", 2009 IEEE International Conference on Cluster Computing and Workshops, 10 pages, © 2009 IEEE.
Polte et al., "Enabling Enterprise Solid State Disks Performance", 1st Workshop on Integrating Solid-state Memory into the Storage Hierarchy, Mar. 7, 2009, Washington DC, 7 pages.
Tallis, Billy, "Microchip Announces DRAM Controller for OpenCAPI Memory interface", AnandTech, Aug. 5, 2019, 7 pages, <https://www.anandtech.com/show/14706/microchip-announces-dram-controller-for-opencapi-memory-interface>.

*Primary Examiner* — Gregory A Kessler
(74) *Attorney, Agent, or Firm* — Brandon L. Stephens

(57) ABSTRACT

Methods, computer program products, and/or systems are provided that perform the following operations: determining a pacing requirement for host requests based on one or more thresholds; setting a pacing delay level based on the one or more thresholds in response to the determination of the pacing requirement; and implementing a memory request flow for a host request based on the pacing requirement and the pacing delay level.

20 Claims, 7 Drawing Sheets

HOST REQUEST PACING TO BALANCE RESOURCES AND THROUGHPUT

BACKGROUND

The present invention relates generally to the field of system management, and more particularly to providing for the use of request pacing to balance host throughput and media resources.

SUMMARY

According to an aspect of the present invention, there is a method, computer program product and/or system that performs the following operations (not necessarily in the following order): determining a pacing requirement for host requests based on one or more thresholds; setting a pacing delay level based on the one or more thresholds in response to the determination of the pacing requirement; and implementing a read/write request flow for a host request based on the pacing requirement and the pacing delay level.

DETAILED DESCRIPTION

Figure 1:
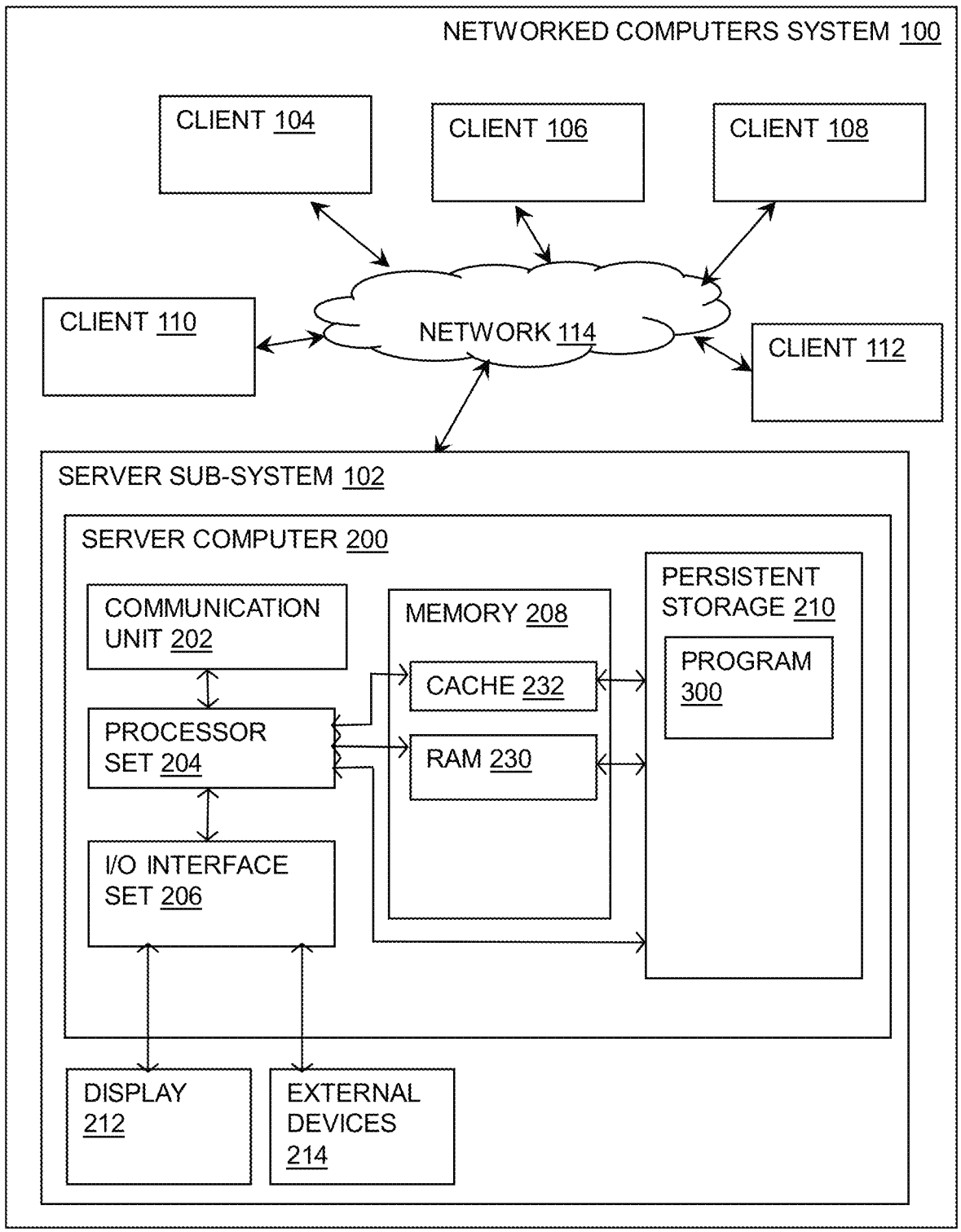
FIG. 1 depicts a block diagram view of a first embodiment of a system, according to the present invention.

According to aspects of the present disclosure, systems and methods can be provided to allow for host request (e.g., read requests, write requests, etc.) pacing. In particular, systems and methods of the present disclosure can provide for implementing host request pacing, for example, based on available resources, defined thresholds, end/or the like. The systems and methods of the present disclosure can provide for determining a need for pacing host requests, for example to balance throughput, available resources, and/or the like. In some embodiments, the systems and methods of the present disclosure can provide for determining a pacing level indicating how long a host request should be delayed. In some embodiments, the systems and methods of the present disclosure can provide for managing the processing of host requests (e.g., request/response processing flows, etc.) based on the pacing level, for example, using one or more queues.

In general, storage class memory (SCM) can connect to a host system via interfaces such as open memory interface (OMI), open coherent accelerator processor interface (OCAPI), PCI Express (PCIe) compute express link (CXL), and/or the like. In some situations, if the SCM media, for example, NAND flash and/or the like, is slower than dynamic random-access memory (DRAM), new write requests from the host can easily outpace the rate of garbage collection (e.g., memory management, etc.) and consume all available media resources.

Additionally, host read request may also be delayed by media garbage collection or media error recovery. While reads and writes could be performed to other media resources, allowing them to execute at the maximum rate could create a scenario where too many reads are issued to the media resource that is blocking reads. If the backlog of reads gets too large, new host requests could be prevented from completing and could cause host timeouts.

Accordingly, embodiments of the present disclosure can provide pacing of host requests (e.g., reads, writes, etc.) to assist in avoiding seriously low resource levels, request backlogs, host timeouts, and/or the like.

Some embodiments of the present disclosure can assist in balancing performance differences between a highspeed host interface and any media that is slower than DRAM, for example, NAND Flash and/or the like. In some embodiments, balancing performance differences may not require foreground firmware intervention in the read and write flow. In some embodiments, the performance at the host interface may not be affected until/unless pacing is required. Some embodiments of the present disclosure can assist in preventing large backlogs of read requests to a media resource affected by garbage collection, error recovery, and/or the like that is managed entirely by hardware. In some embodiments, systems and methods can provide for self-tuning to any host workload.

In some embodiments, systems and methods of the present disclosure can provide request pacing whereby each new write request from a host can be delayed by a programmable number of clock cycles. Hardware can perform the delay before beginning the write processing. In some embodiments, the necessary write request delay can be determined based on available resources. In some embodiments, read requests from the host would not be processed until all previously delayed write requests are processed. This can prevent data integrity problems if a write is delayed and the host tries to read the same address.

In some embodiments, responses to host read requests can be delayed if any other active read request is being delayed by long media access times, for example. In some embodiments, this delay function may be totally under hardware control.

In some embodiments, a pace count (e.g., request pace count, hardware pace count, etc.) can be used to count clock cycles since the last paced event (e.g., request or response) occurred. The pace count is decremented every clock cycle if the pace count is non-zero (e.g., greater than zero (0), etc.).

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can determine a need for host request pacing, determine a pacing delay level (e.g., based on the need for pacing, etc.), establish, manage, etc. a queue for host requests to provide request pacing, manage request pacing, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
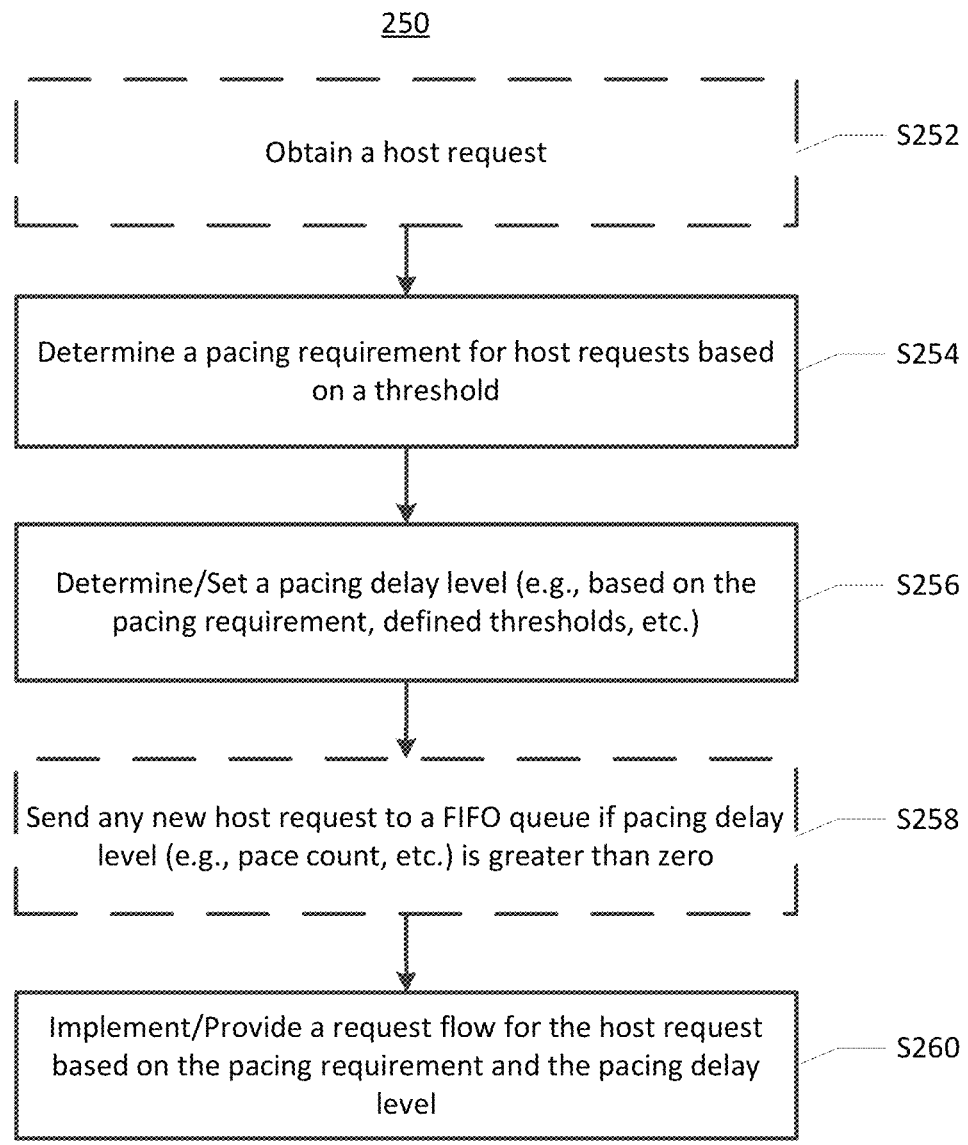
FIG. 2 depicts a flowchart showing a first embodiment method performed, at least in part, by the first embodiment system.
Figure 3:
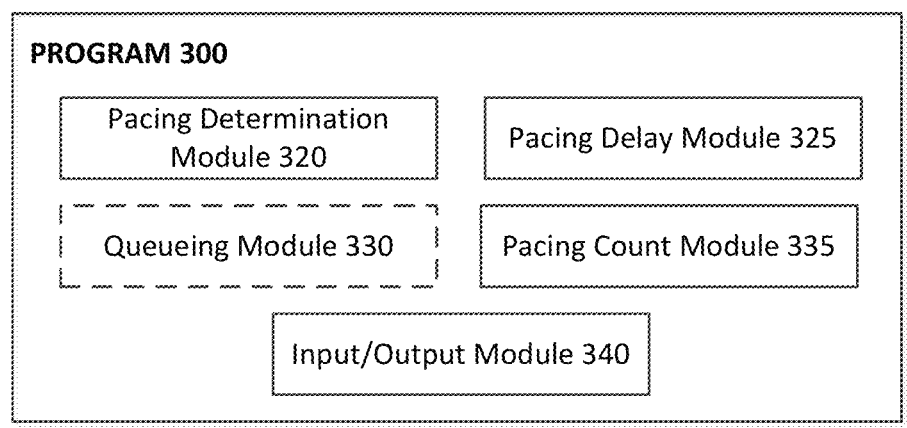
FIG. 3 depicts a block diagram showing an example machine logic (for example, software) portion of the first embodiment system.

FIG. 2 shows flowchart 250 depicting a computer-implemented method, according to embodiment(s) of the present invention. FIG. 3 shows a program 300 for performing at least some of the method operations of flowchart 250.

Regarding FIG. 2, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for host request pacing may optionally begin at operation S252, where a computing system (e.g., server computer 200 of FIG. 1 or the like) can identify and/or obtain a host request (e.g., read request, write request, etc.). As an example, an input/output module 340 of FIG. 3, pacing determination module 320, and/or the like can provide for identifying and/or obtaining host requests.

Processing proceeds to operation S254, where the computing system (e.g., server computer 200 of FIG. 1 or the like) can determine a pacing requirement, for example, based on one or more thresholds. As an example, a pacing determination module 320 and/or the like can provide for determining whether a pacing requirement is needed for host requests or events (e.g., write requests, read, requests, read responses, etc.) In some embodiments, the pacing determination module 320 and/or the like can provide for determining a pacing requirement based on one or more thresholds such as available resources, media access times, and/or the like.

For example, in some embodiments, write request pacing requirements can be determined based on levels of available media resources. As an example, a set of ready-to-use (RTU) thresholds can be established and matched to policy for performing garbage collection. These thresholds can also determine if write pacing is needed as well as the level of write pacing needed to avoid using up all available resources (e.g., RTU=0%).

In some embodiments, as another example, read response pacing requirements can be determined based on media access times (e.g., reads, etc.). For example, a determination can be made for pacing read responses to the host to prevent the host from potentially issuing new reads that require the media resources affected by garbage collection, error recovery, and/or the like. In some embodiments, a first threshold (e.g., long media access time threshold) can be defined to determine if read response pacing may be required, when sending a response to each host read. For example, if any host reads are still active (e.g., pending read response, etc.) and are taking longer than a defined number (e.g., X) of clock cycles (e.g., long media access time threshold), read response pacing can be initiated. In some embodiments, X (e.g., long media access time threshold) should be sufficiently large to prevent pacing until absolutely required.

Processing proceeds to operation S256, where the computing system (e.g., server computer 200 of FIG. 1 or the like) can set a pacing delay level. The computing system can determine and/or set a pacing delay level based on a pacing requirement determination, one or more thresholds (e.g., available resources, access times, etc.), and/or the like. As an example, a pacing module 325 of FIG. 3 and/or the like may determine and/or set a pacing delay level for requests/events (e.g., write requests, read requests, read responses, etc.).

For example, in some embodiments, a write pacing delay (e.g., pacing delay level) can be used to determine how long to delay between processing new write requests from a host. In some embodiments, a delay value of zero can disable write request pacing. In some embodiments, a set of ready-to-use (RTU) thresholds can be established and matched to policy for performing garbage collection and/or the like. These thresholds can also determine the level of write pacing (e.g., pacing delay level, etc.) needed to avoid using up all available resources (e.g., RTU=0%).

As another example, in some embodiments, a fixed delay (e.g., Z) can be defined to determine how long to delay a read response (e.g., pacing delay level, etc.) for read response pacing, for example, when there is an active read taking longer than X clock cycles.

Optionally, in some embodiments, processing may continue to operation S258, where the computing system (e.g., server computer 200 of FIG. 1 or the like) can send new host requests (e.g., read requests, write requests, etc.) to a first in, first out queue when request/event pacing is needed (e.g., requests/responses should be delayed to balance resources, etc.). As an example, a queuing module 330 of FIG. 3 and/or the like may provide for implementing and/or managing queues, such as a first in first out (FIFO) queue, to facilitate request pacing. In some embodiments, for example, in some embodiments, the computing system (e.g., a hardware host interface, etc.) can place new host requests into a FIFO queue. The requests are processed in the order received and remain in the FIFO queue until any required pacing delay is completed. In some embodiments, while a read request itself is not paced, a read request will be delayed if writes issued before the read request are delayed.

As another example, in some embodiments, if there is an active read taking longer than X clock cycles, all read responses to the host that have not taken longer than Y clock cycles (e.g., pacing bypass threshold, etc.) will be sent to a read response FIFO queue. A second defined threshold (e.g., Y) can be used to determine whether a given host response should be delayed or if pacing should be bypassed. The computing system can remove and process a read response from the FIFO queue every Z clock cycles (e.g., pacing delay level, etc.) while the read response FIFO queue is not empty.

Processing proceeds to operation S260, where the computing system (e.g., server computer 200 of FIG. 1 or the like) can implement a memory request (e.g., read request, write request, read response, etc.) flow (e.g., request processing flow, etc.) based on the pacing requirement, pacing delay level, and/or the like. As an example, a pacing count module 335, a queuing module 330 of FIG. 3, and/or the like can provide for assisting request/response process flows when a pacing requirement is determined for host requests. For example, a pacing count module 335 can manage a pace count indicating clock cycles since a last paced event, manage the pacing delay between write requests (e.g., in FIFO queue, etc.), manage the pacing delay between read responses (e.g., in read response FIFO queue, etc.), and/or the like.

For example, in some embodiments, when write pacing is required, the computing system (e.g., hardware host interface, etc.) can place new host requests into a FIFO queue and/or the like. The queued requests are processed in the order received and remain in the FIFO queue until any required pacing delay has been completed. While a read request itself is not paced, it will be delayed if writes issued before read request are delayed.

As another example, in some embodiments, when read response pacing is required (e.g., an active read taking longer than X clock cycles, etc.) all read responses to the host that have not taken longer than Y clock cycles (e.g., pacing bypass threshold) can be sent to a read response FIFO queue and/or the like. The computing system can remove and process a read response from the FIFO every defined number (e.g., Z) of clock cycles while the FIFO is not empty. When the computing system detects that there are no longer any active host reads that require read pacing, the read response FIFO can be drained without delays and read pacing will be effectively disabled until another host read crosses the long media access time threshold (e.g., X).

Further Comments and/or Embodiments

Figure 4:
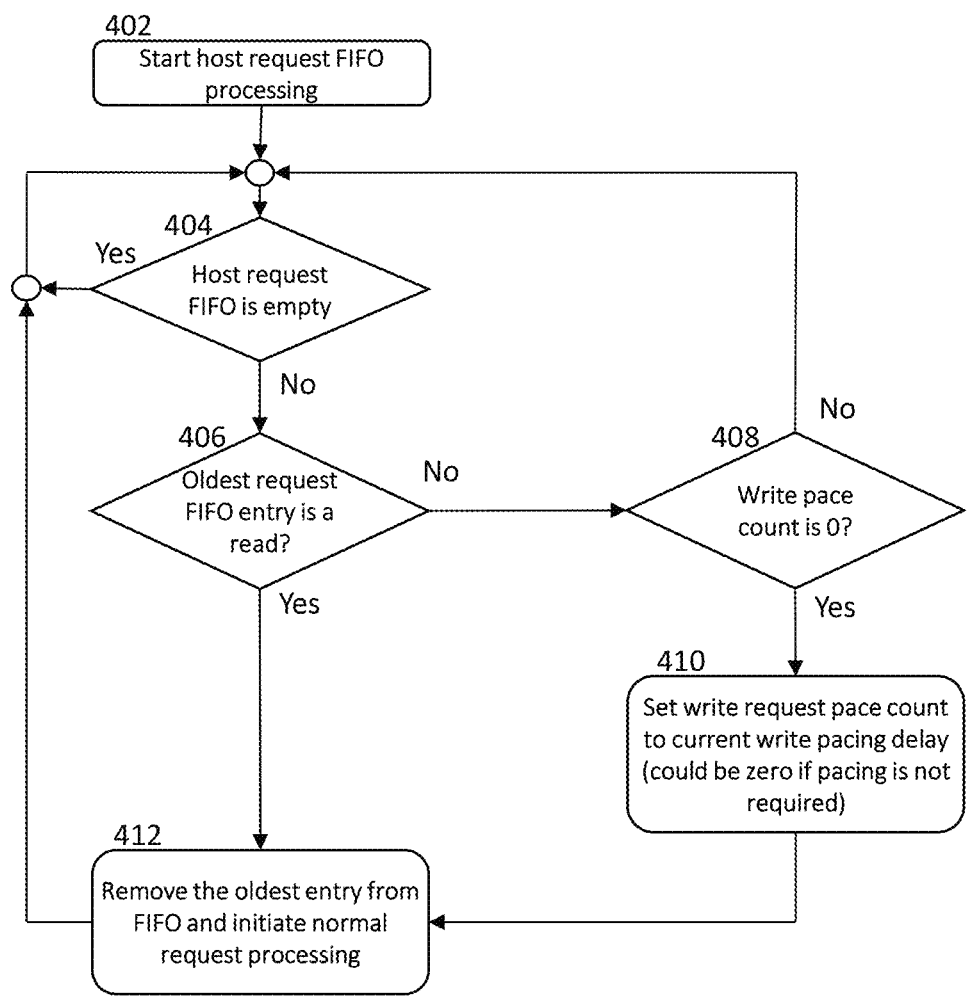
FIG. 4 depicts a flowchart of an example host memory request flow, according to embodiments of the present invention.

FIG. 4 depicts a flowchart 400 of an example host memory request flow, according to embodiments of the present invention. In some embodiments, a host request FIFO queue is used to place new read requests and write requests during request pacing. The requests would be processed in the order received. A write pacing delay (e.g., pacing delay level, etc.) provides the pacing delay between processing write requests and, in some embodiments, can be set based on resource utilization. A write pacing count can be used by the computing system to count clock cycles until the next paced request can be processed. The pacing count can be decremented every clock cycle when the pacing count is non-zero (e.g., greater than zero).

The write pacing delay can be a firmware input to hardware that is used to determine how long to delay between processing new write requests from the host. A value of zero disables write request pacing.

A set of ready-to-use (RTU) thresholds can be established and matched to policy for performing garbage collection and/or the like. These thresholds can also be used to determine the level of write pacing needed to avoid using up all available resources (e.g., RTU=0%).

The computing system (e.g., hardware host interface) can place new host requests into a FIFO. The requests are processed in the order received and remain in the FIFO until any required pacing delay is completed. While a read request itself is not paced, it will be delayed if writes issued before the read request are delayed.

As illustrated in FIG. 4, host request FIFO processing begins at operation 402. Processing proceeds to operation 404 where a determination is made whether the host request FIFO queue is empty. If the host request FIFO queue is empty, processing returns to operation 404.

If the host request FIFO queue is not empty, processing proceeds to operation 406 where a determination is made regarding the oldest request entry in the FIFO queue. If, at operation 406, the oldest request entry in the FIFO queue is a read request, processing proceeds to operation 412. At operation 412, the oldest entry from the FIFO queue (e.g., read request) is removed and normal request processing is initiated. Processing then returns to operation 404.

If, at operation 406, the oldest request entry in the FIFO queue is not a read request (e.g., is a write request), processing proceeds to operation 408. At operation 408, a determination of the write pace count is made. If the write pace count is not zero (0), processing returns to operation 404. If the write pace count is zero (0), processing proceeds to operation 410 where the write pace count is set to a current write pacing delay. Processing proceeds to operation 412 where the oldest entry from the FIFO queue (e.g., write request) is removed and normal request processing is initiated. Processing then returns to operation 404.

Figure 5:
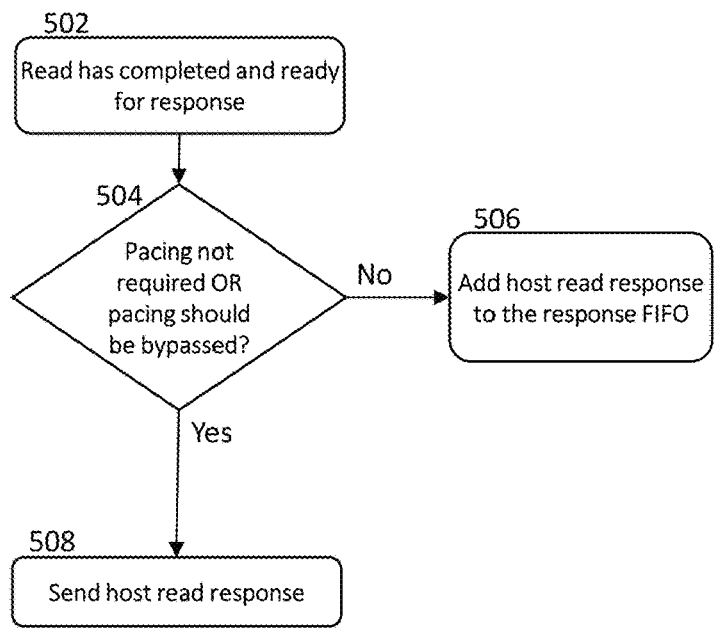
FIG. 5 depicts a flowchart of an example read response flow, according to embodiments of the present invention.

FIG. 5 depicts a flowchart 500 of an example read response flow, according to embodiments of the present invention. As illustrated in FIG. 5, host read response processing flow begins at operation 502, where a read request has been completed and a read response is ready for the host.

Processing proceeds to operation 504, where a determination is made whether pacing is not required or if pacing should be bypassed. If, at operation 504, pacing is not required or pacing is to be bypassed, processing proceeds to operation 508. At operation 508, the ready host read response is sent as normal.

If, at operation 504, pacing is required (e.g., pending read response exceeding threshold, etc.) and pacing is not to be bypassed, processing proceeds to operation 506. At operation 506. The host read response is added to a response FIFO queue to implement read response pacing. The read response pacing flow using the FIFO queue will be described with regard to FIG. 6.

Figure 6:
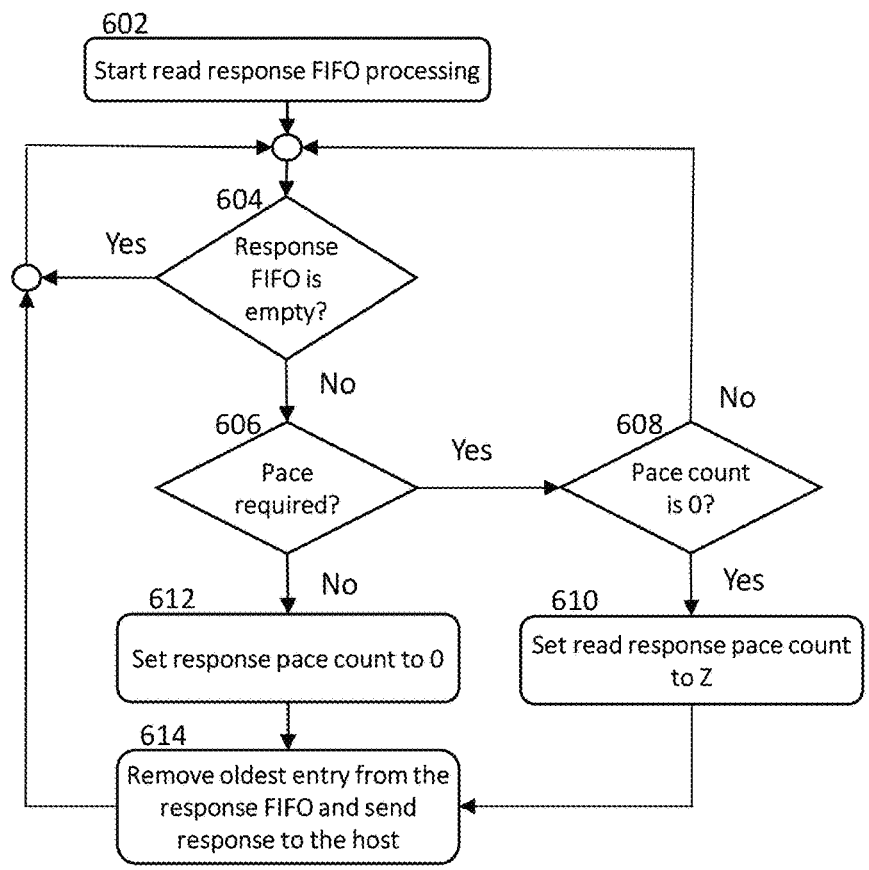
FIG. 6 depicts a flowchart of an example read response first in, first out flow, according to embodiments of the present invention.

FIG. 6 depicts a flowchart 600 of an example read response first in, first out flow, according to embodiments of the present invention. Read response FIFO illustrates the interface between the read response processing and the FIFO processing.

Read response pacing count is used by hardware (e.g., computing system, etc.) to count clock cycles until the next paced response can be sent. The read response pacing count is decremented every clock cycle if non-zero (e.g., greater than zero, etc.).

A pacing required determination is made if any active read operation has exceeded X clock cycles (e.g., defined long access time threshold). In some embodiment, threshold X can be programmable (e.g., 2M clocks).

Pacing bypass is determined if the current read being responded to has already exceeded Y clock cycles (e.g., defined pacing bypass threshold). In some embodiments, a threshold Y can be programmable (e.g., 512K clocks).

Pacing delay defines the number of clock cycles (e.g., Z) between delayed read responses. In some embodiments, delay Z can be programmable (e.g., 256).

As illustrated in FIG. 6, host read response FIFO processing flow begins at operation 602. Processing proceeds to operation 604 where a determination is made whether the response FIFO is empty. If the response FIFO is empty processing returns to operation 604. If the response FIFO is not empty, processing proceeds to operation 606, where a determination is made whether pacing is required.

If pacing is not required, processing proceeds to operation 612, where the response pace count is set to zero (0). Processing proceeds to operation 614 where the oldest entry from the response FIFO is removed and the response is sent to the host. Processing then returns to operation 604.

If pacing is required, processing proceeds to operation 608, where a pace count determination is made. If the pace count is not zero (0), processing returns to operation 604. If the pace count is zero (0), processing proceeds to operation 610, where the read response pace count is set to Z (e.g., defined delay value). Processing then proceeds to operation 614 where the oldest entry from the response FIFO is removed and the response is sent to the host. Processing then returns to operation 604.

Figure 7:
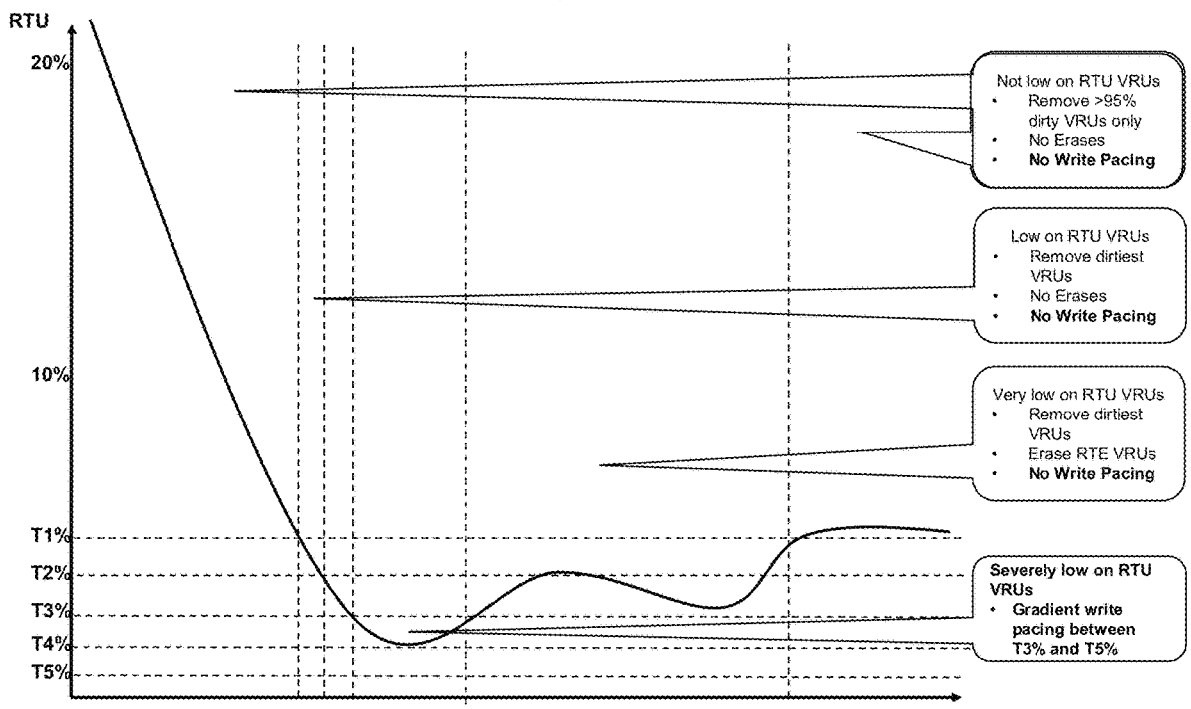
FIG. 7 depicts a diagram of example write request pacing thresholds, according to embodiments of the present invention.

FIG. 7 depicts a diagram of example write request pacing thresholds 700, according to embodiments of the present invention. A set of ready-to-use (RTU) thresholds are established and matched to policy for performing garbage collection. These thresholds will also determine the level of write pacing needed to avoid using up all available resources (RTU=0%).

When not low on RTU resources, e.g., >T3%, no write pacing is performed. Garbage collection may be occurring but there are enough RTU resources to complete new host write requests at the maximum rate possible.

When severely low on RTU resources, e.g., <T3%, firmware will set the level of write pacing based on the RTU percentage. Firmware will increase the level of pacing as the RTU percentage continues to decrease. The maximum write pacing level at T5% will allow the rate of garbage collection to outpace the rate of new host writes but is still low enough to prevent the host from timing out writes.

Firmware will gradually decrease the level of write pacing as the RTU percentage increases again and will eventually disable it until needed again. Hardware will delay each new write request based on the pacing value set by firmware.

Figure 8A:
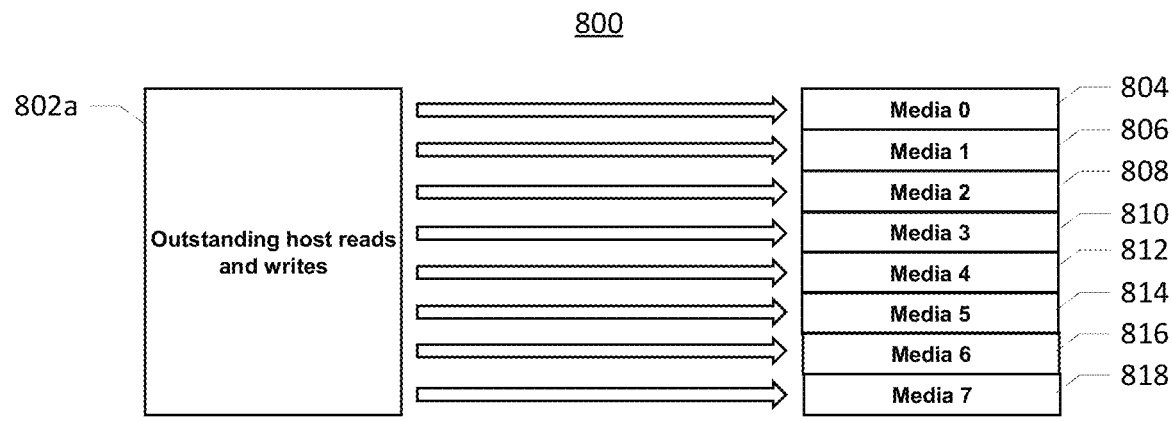
FIG. 8A through FIG. 8C depict block diagrams of example read request pacing, according to embodiments of the present invention.
Figure 8B:
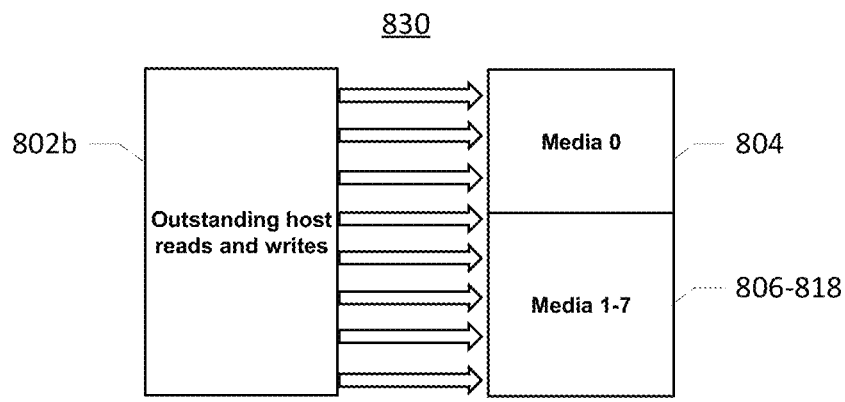
Figure 8C:
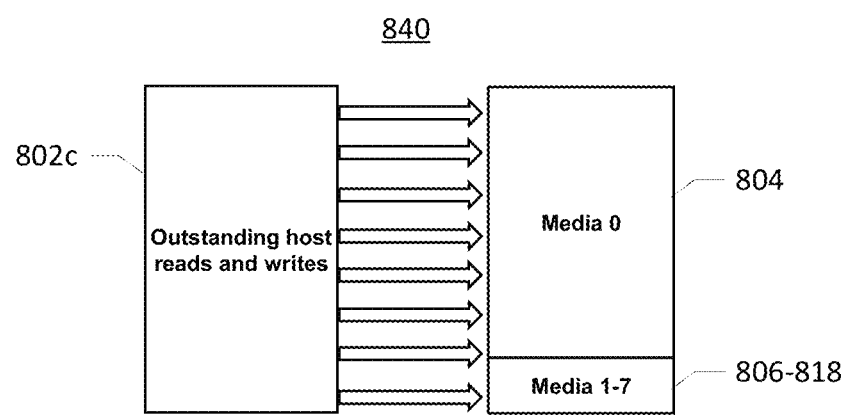

FIG. 8A through FIG. 8C depict block diagrams of example read request pacing, according to embodiments of the present invention. As illustrated in FIG. 8A through FIG. 8C, outstanding host requests 802a, 802b, and 802c are targeted to media resources 804-818 for read and/or write operations.

As illustrated in FIG. 8A, diagram 800, ideally, all media resources (e.g., media resources 804-818) will be targeted evenly (e.g., NAND Flash accesses would be spread evenly across all dies). This results in equal host interface resources (e.g., outstanding host requests 802a) targeting each media resource.

As illustrated in FIG. 8B, diagram 830, certain media operations (e.g., NAND Flash Erases) or media error recovery could add significant delays to media reads. This can result in more host resources (e.g., outstanding host requests 802b) tied up for the affected media resource (e.g., media resource 804). Host interface timeouts could occur if the backlog gets too large.

As illustrated in FIG. 8C, diagram 840, as reads complete, they could be replaced by a host request (e.g., from 802c) accessing the affected media resource (e.g., media resource 804).

Embodiments of the present disclosure assist in minimizing the maximum size of a backlog by delaying individual read responses to the host until the long reads complete. Responses are only delayed while long reads are active. This will not affect performance during normal operations.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   determining a pacing requirement for host requests based on one or more thresholds;
   setting a pacing delay level based on the one or more thresholds in response to the determination of the pacing requirement;
   implementing a memory request flow for a host request based on the pacing requirement and the pacing delay level; and
   processing the host request based on the implemented memory request flow.

2. The computer-implemented method of claim 1, wherein setting the pacing delay level comprises setting a pace count indicative of a number of clock cycles to delay the host request, and wherein the pace count is decremented every clock cycle when the pace count is greater than zero.

3. The computer-implemented method of claim 1, wherein the host requests include a write request and wherein the pacing requirement is determined based on available resources.

4. The computer-implemented method of claim 3, wherein the one or more thresholds represent a level of available resources.

5. The computer-implemented method of claim 4, wherein the pacing delay level is increased as the level of available resources decreases.

6. The computer-implemented method of claim 3, wherein new host requests are added to a first in, first out queue in response to the pacing delay level being greater than zero.

7. The computer-implemented method of claim 3, wherein new read requests are delayed until previously delayed write requests are processed.

8. The computer-implemented method of claim 1, wherein the host requests include a read request and wherein the pacing requirement is based on exceeding a threshold long access time for an active read request.

9. The computer-implemented method of claim 8, further comprising, in response to determining the active read request has exceeded the threshold long access time:

sending a pending read response that has not exceeded a pacing bypass threshold to a first in, first out queue; and setting the pacing delay level to a defined number of clock cycles when the first in, first out queue includes one or more pending read responses, wherein the memory request flow for the host request includes processing an oldest read response from the first in, first out queue based on the pacing delay level.

10. A computer program product comprising a computer-readable storage medium having stored thereon:

program instructions programmed to determine a pacing requirement for host requests based on one or more thresholds;

program instructions programmed to set a pacing delay level based on the one or more thresholds in response to the determination of the pacing requirement;

program instructions programmed to implement a memory request flow for a host request based on the pacing requirement and the pacing delay level; and program instructions programmed to process the host request based on the implemented memory request flow.

11. The computer program product of claim 10, wherein setting the pacing delay level comprises setting a pace count indicative of a number of clock cycles to delay the host request, and wherein the pace count is decremented every clock cycle when the pace count is greater than zero.

12. The computer program product of claim 10, wherein the host requests include a write request and wherein the pacing requirement is determined based on available resources.

13. The computer program product of claim 12, wherein the one or more thresholds represent a level of available resources and wherein the pacing delay level is increased as the level of available resources decreases.

14. The computer program product of claim 12, wherein new host requests are added to a first in, first out queue in response to the pacing delay level being greater than zero.

15. The computer program product of claim 10, wherein the host requests include a read request and wherein the pacing requirement is based on exceeding a threshold long access time for an active read request.

16. The computer program product of claim 15, the computer-readable storage medium having further stored thereon:

program instructions programmed to, in response to determining the active read request has exceeded the threshold long access time, send a pending read response that has not exceeded a pacing bypass threshold to a first in, first out queue; and program instructions programmed to set the pacing delay level to a defined number of clock cycles when the first in, first out queue includes one or more pending read responses;

wherein the memory request flow for the host request includes processing an oldest read response from the first in, first out queue based on the pacing delay level.

17. A computer system comprising:

a processor set; and a computer-readable storage medium;

wherein:

the processor set is structured, located, connected and programmed to run program instructions stored on the computer-readable storage medium; and the stored program instructions include:

program instructions programmed to determine a pacing requirement for host requests based on one or more thresholds;

program instructions programmed to set a pacing delay level based on the one or more thresholds in response to the determination of the pacing requirement;

program instructions programmed to implement a memory request flow for a host request based on the pacing requirement and the pacing delay level; and program instructions programmed to process the host request based on the implemented memory request flow.

18. The computer system of claim 17, wherein the host requests include a write request and wherein the pacing requirement is determined based on available resources.

19. The computer system of claim 17, wherein new host requests are added to a first in, first out queue in response to the pacing delay level being greater than zero.

20. The computer system of claim 17, wherein the host requests include a read request and wherein the pacing requirement is based on exceeding a threshold long access time for an active read request.

* * * * *